Aug. 6, 1963　　　P. C. F. DEFFRENNE　　　3,100,130
SELF-ADJUSTING FLUID BEARING
Filed Dec. 15, 1960　　　　　　　　　　　　2 Sheets-Sheet 1

INVENTOR
PAUL C.F. DEFFRENNE
BY
ATTORNEY

INVENTOR
PAUL C. F. DEFFRENNE

United States Patent Office

3,100,130
Patented Aug. 6, 1963

3,100,130
SELF-ADJUSTING FLUID BEARING
Paul C. F. Deffrenne, Geneva, Switzerland, assignor to Mecanorga S.A., Geneva, Switzerland, a corporation of Switzerland
Filed Dec. 15, 1960, Ser. No. 75,981
6 Claims. (Cl. 308—122)

Up to the present time, various methods have been proposed for positioning a rotationally or translationally moving body with reference to a stationary body, but these methods all show serious drawbacks in so far as the location of the rotary or translational axis of the movable body with reference to the stationary body depends on the intensity and on the direction of outer stresses exerted on the movable body.

For instance in the particular case of the rotation of a shaft in a bearing, the location of the rotary axis of the shaft with reference to the axis of its bearing varies to a substantial extent as a function of the intensity or direction of the outer stresses exerted on the shaft.

In the case of a conventional hydrodynamic bearing, the oil film produced by the rotation of the shaft is crushed to a more or less considerable extent when the load increases or is reduced and it is in fact impossible in certain cases to prevent the breaking of the oil film, which leads to a direct contact between the shaft and the bearing.

In the case of a so called fluid bearing wherein a specially designed circuit of a carrier fluid under pressure is inserted between the shaft and the bearing as provided by the presence of chambers formed between said two bodies, the above-mentioned drawback may be somewhat reduced but, as a consequence of the actual principle of the method resorted to, it cannot be entirely cut out. The chief feature of the method considered consists as a matter of fact in the application to the supporting of a body, of the laws governing the flow of a fluid between two ports, one of these being constituted by the clearance between the movable body and the stationary body along the periphery of one of the chambers containing the fluid under pressure. The pressure of the carrier fluid inside said chamber depends therefore solely for a predetermined feed pressure on the value of said clearance, i.e. in practice on the position of the movable body with reference to the stationary body. The fact that the pressure of the carrier fluid has to balance a variable outer stress implies therefore, in the particular case of a fluid bearing, that the position of the shaft with reference to the bearing, which position adjusts alone the value of said pressure, must be itself variable. The shifting of the rotary axis of the shaft is therefore in such a case an essential condition for the shaft to continue being carried in a reliable manner when the outer stresses vary and the balance of the system can be obtained only for an eccentric position of the shaft with reference to the bearing. This drawback would be in fact the same if one were to use without any further precaution an arrangement for controlling the position of the shaft with reference to the bearing with a view to adjusting the pressure of the fluid as a function of the indications of said arrangement. It might be possible to cut out this drawback by resorting to the indications of a control arrangement adapted to produce through a suitable system of auxiliary means a modification of the antagonistic stress, said auxiliary means maintaining their action until the shaft has returned to its original starting position. However another drawback appears in this case, which drawback consists in that, under the action of the antagonistic stress, the shaft moves beyond its original position of equilibrium and from this moment onwards, the modification of the stress will exert an action in the opposite direction. Thus, the shaft returns into its position of equilibrium through an oscillatory movement but, by reason of the time required for the reaction of the various arrangements, the oscillations are not damped and, in contradistinction, they are amplified. The damping of such oscillations requires the solution of problems which are far beyond the purpose considered and no application of a practical importance can be hoped for.

Many commercial applications require however more and more the execution of the various movements of the parts with reference to each other in a manner as independent as possible from the intensity and direction of the outer stresses exerted on them. This is of particular importance for instance in the case of highly accurate machine-tools, whether in the case of the rotary movement of parts inside bearings or the like or else of a translational movement such as that of sliders or pistons.

The present invention has for its object to remove efficiently the above-mentioned drawbacks and more particularly it covers a method for positioning a translationally and/or rotationally moving body with reference to a stationary body. According to said improved method, there is provided permanently a control, in one or more areas, of the distance of the movable body with reference to a correcting member and the position of the latter with reference to the movable body adjusts the intensity of a variable antagonistic force exerted by a fluid inserted between the two movable and stationary bodies and adapted to equilibrate the component of the outer stresses in the corresponding area, while on the other hand said correcting member is subjected in its turn automatically to a compensating movement. Consequently said correcting member is subjected to a movement towards or away from the wall of the stationary body which ensures its guiding, the amount of last-mentioned movement being equal to that by which the movable body is shifted towards or away from said correcting member and the final result consists in that the movable body is maintained in its original position of equilibrium with reference to the stationary body or is returned into said original position. Thus, the position of the rotary axis or of the translational axis of the movable body remains perfectly independent of the intensity or of the direction of the outer stress exerted on said movable body.

The invention has also for its object an arrangement for guiding a movable body with reference to a stationary body for the execution of the method disclosed hereinabove. Said arrangement includes at least one chamber provided between the adjacent walls of the two bodies, said chamber being adapted to be fed with a compressed fluid and, according to the invention, there are provided, for each chamber, means for adjusting the distance between the movable body and a correcting member of which the position with reference to the movable body adjusts the intensity of the variable, antagonistic force exerted by the fluid under pressure with a view to balancing the component of the outer stress in the corresponding area while, on the other hand, said correcting member is subjected automatically to a compensating movement and consequently is shifted nearer to or away from the wall of the stationary body, which ensures a guiding over a distance equal to that by which the movable body moves nearer or away from said correcting member and this results finally in maintaining the movable body in its original position of equilibrium with reference to the stationary body or in returning it into said position.

The accompanying drawings illustrate diagrammatically and by way of example a preferred embodiment of an arrangement according to the invention. In said drawings.

Figure 1:
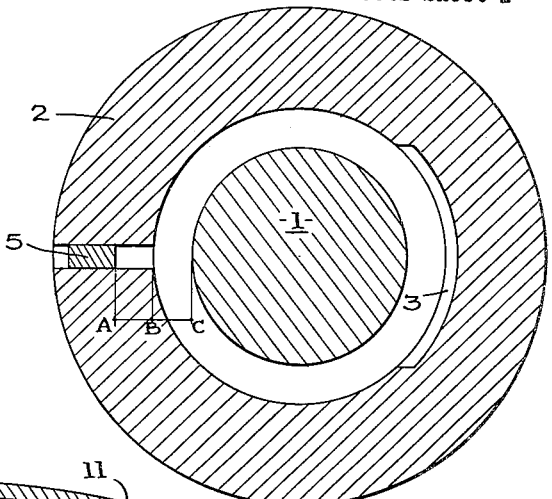
FIG. 1 illustrates diagrammatically the method forming the subject of the invention.

Turning to FIG. 1, the method is assumed to be applied to the rotation of a movable member 1 with reference to a stationary body 2. A first device adjusts permanently the distance between the movable body 1 and a correcting member 5. The fluid under pressure contained in the chamber 3 formed in a recess of the body 2 exerts an antagonistic stress on the movable body 1 with a view to balancing the corresponding component of the outer stress and the value of which depends on the distance AC of the correcting member 5 with reference to the movable body 1.

For any position of equilibrium, the distance between the movable body 1 and the stationary body 2 may be illustrated by the vector BC which is equal to the difference $$BC = AC - AB$$

AC being the distance between the correcting member 5 and the movable body 1 while AB is the distance between he correcting member 5 and the wall of the stationary body 2 which is entrusted with the guiding of the movable body.

Now, if by reason of a modification in the outer stress, the distance AC varies with a view to producing a modification in the antagonistic force and the establishment of a novel equilibrium, the distance between the movable body 1 and the stationary body 2 will become equal to:

$$B'C' = A'C' - A'B'$$

The modification in the location of the axis of the movable body 1 will therefore be equal to:

$$A'C' - AC = A'B' - AB$$

Now, since as disclosed $$A'C' - AC = A'B' - AB$$

The consequence is that:

$$B'C' - BC = 0$$

which shows that whatever may be the modifications of the outer stress the location of the movable body 1 has not changed.

Many and various embodiments may be resorted to for the execution of such a method.

The number of chambers carrying fluid under pressure and their distribution and relative size may vary in accordance with the problems which are to be solved. These chambers may obviously be provided as well on either of the bodies considered.

The means for adjusting the position of the movable body with reference to the correcting member may be of any type whatever and their operation may depend on any physical or mechanical principle. For practical reasons, it seems however preferable in most cases to resort to a type of apparatus the operation of which depends on the flow of a fluid in a predetermined circuit and preferably of the same fluid as that which feeds the chamber under pressure.

The variation in the antagonistic force exerted by the fluid under pressure with a view to returning the movable body into its original position may be produced through various means such for instance as a modification in the pressure of the fluid, a modification of the area of the chamber under pressure acting on the movable member, said means being combined if desired, while any other suitable means may be resorted to.

The correcting member the movements of which are controlled directly by the modifications in the antagonistic stress may be of any type desired and it may in particular be constituted by one or more slide valves. The movements of said slide valves may be a tranlational movement or else a rotary movement.

Obviously, the fluid feeding the chamber may be constituted by any liquid or gas as required by the practical conditions of operation. In certain cases, such for instance as the application to machines wherein no oil is allowed or else to those which operate in an abrading medium or again when the fluids used are not constituted by viscous fluids, the bearings of the movable members are of a fluid-tight type or else are efficiently isolated.

Preferably and with a view to cutting out any risk of direct contact at the start, the circuit of fluid under pressure is established before the movable body begins moving.

By way of example, a preferred embodiment will now be described in a more detailed manner. Said embodiment relates to the rotation of a movable body inside a stationary body, for instance that of a shaft inside a bearing; but obviously, the operation would be the same if the movable body were lying no longer inside but outside the stationary body or else in the presence no longer of a rotation, but of a translational movement as in the case of slideways or of pistons or again if the movement of the movable body were a combination of these various movements.

Of course, there are several groups of chambers subjected to pressure and associated arangements, say three groups distributed at 120° from each other, but the operation of only one of such groups need be described.

Lastly, the modification in the antagonistic force adapted to return the shaft into its starting position is produced by a modification in the fluid pressure. It may also be obtained by a modification in the operative surface of the chambers subjected to pressure.

The following disclosure is given solely by way of example and covers merely the application of the invention to a particular case, to wit that of a bearing, of the general principle underlying the above-described method.

Figure 2:
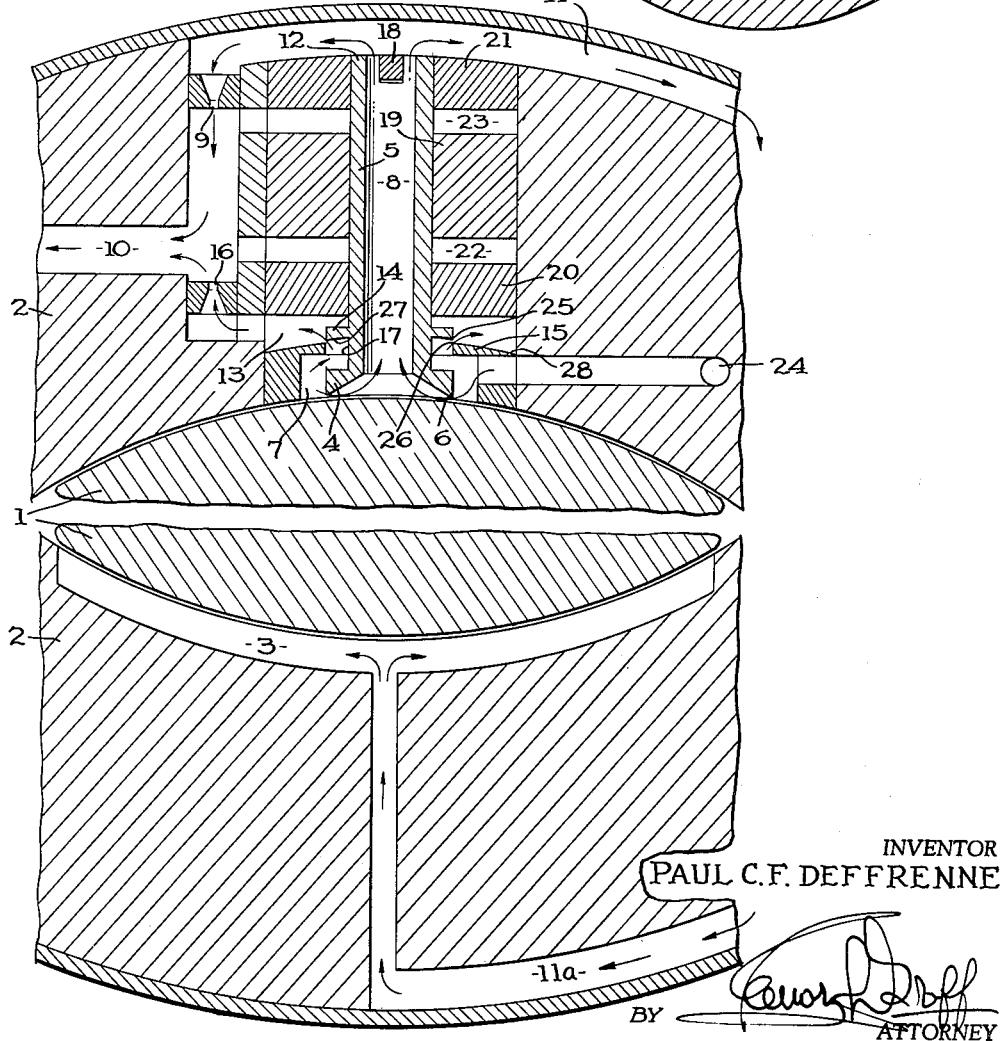
FIG. 2 is a fragmentary cross-section through a bearing operating in accordance with said method.

Turning to FIG. 2, the shaft 1 is carried inside the bearing 2 with a slight clearance. A chamber fed with a fluid under pressure is shown at 3 and its part consists in opposing any shifting of the shaft 1 in the corresponding area under the action of any modification in the component of the outer stresses extending perpendicularly to said area; said chamber formed in the wall of the bearing 2 is bounded by an overlapping area of a comparatively large size which prevents, by reason of the reduced clearance provided thereby between said shaft 1 and said bearing 2, any substantial flow of fluid along the outer periphery of the chamber 3 in any direction whatever.

In the area which is diametrically opposed to the chamber under pressure 3 is located a scanning head 4 of an arrangement adapted to permanently define the distance of the shaft 1 with reference to the correcting member 5 with which said scanning head 4 is rigid. In the particular case which is now being described, the control device relies on the flow of a fluid under pressure which is of the same kind as that which feeds the chamber 3 subjected to pressure, said fluid flowing out of a first passage of a variable size constituted by the clearance formed between the shaft 1 and the perimeter or outline of edge 6 of a reduced thickness which matches the cylindrical shape of the shaft 1; said edge 6 rigid with the head 4 forms an annular compartment 7 surrounding the scanning head 4 and into which the fluid under pressure is admitted through a channel 24; the edge 6 separates said compartment from an intermediate chamber 8 inside the correcting member 5 while the outlet for said fluid entering thus the intermediate chamber under the edge 6 is constituted by a port of an unvarying size formed by the outer or outlet port 9 passing through a thin wall extending between the intermediate or radial chamber 8 and a channel 10 opening outwardly of the bearing. In the embodiment illustrated, the chamber under pressure 3 is connected directly with the intermediate chamber 8 through an arcuate channel including a first leg 11 and a second leg 11a. The flow of fluid over the periphery of the chamber 3 subjected to pressure is negligible by reason of the resistance opposed to such a flow by the very small clearance existing between the shaft 1 and the bearing 2 and the breadth of the overlapping area.

The position of the correcting member 5 with reference to the shaft 1 is thus permanently controlled by the arrangement which has just been described and, by reason of said arrangement, the pressure of the fluid inside the chamber 3 is at every moment defined by the distance separating the shaft 1 from the correcting member 5.

However, during operation, the correcting member 5 should be subjected simultaneously to a compensating movement whereby it is shifted nearer or away from the inner wall of the bearing 2 by an amount equal to that by which it moves nearer and or away from the shaft 1.

To this end, the correcting member 5 forms a sort of slide valve which has a tendency to move away from the shaft 1 under the action of the pressure of the fluid which prevails inside the intermediate chamber 8 and is exerted over an area equal to the difference between the cross-section of the scanning head 4 and the outer tail end 12 of the correcting member 5 while a force is exerted on the latter in an opposite direction by the pressure prevailing in an auxiliary chamber 13 and acting on the surface of a flange 14 formed on said correcting member 5. The effective or operative area of the scanning head 4 includes that area of the bottom of the head extending inwardly from the edge 6.

The larger diameter of said flange 14 is designed so as to be equal to that of the scanning head 4 while its inner diameter is equal to that of the outer tail end 12 of the correcting member 5. The operative area of the flange 14 is consequently equal to the difference between the areas of the scanning head 4 and of the tail end 12 of the correcting member 5 so that the two fluid pressures are applied in opposite directions over equivalent areas.

On the other hand, the pressure inside the chamber 13 is adjusted by a flow of fluid between two ports, to wit a first port of a variable size connecting the chamber 13 with the supply of pressure, through a baffle system constituted by the ridges 25 and 26 formed respectively on a cylindrical surface 28 parallel with the guiding surface on the bearing 2 and on the surface 27 of the flange 14 facing away from the auxiliary chamber 13, which surface 27 is constituted also by a section of a cylindrical surface also coaxial with the guiding surface on the bearing 2. The above-mentioned surface 28 forms the outer transverse surface of a ring 15 rigid with the bearing 2 and surrounding the correcting member or valve 5. The outer diameter of the flange 14 having the same value as the inner diameter of the ring 15, the curve constituted by the contact points between the surfaces 25 and 26 is, at least theoretically, identical with the contour or curved edge of the end of the scanning head 4. The port associated with the surfaces 25 and 26 is of predetermined unvarying size and its area is equal to that of the outer port 9 and the inner port 16 formed in a wall between the auxiliary chamber 16 and the outlet channel 10. Under such conditions, the pressure of the fluid is the same in the two chambers 8 and 13 when the spacing between the flange 14 of the correcting member 5 and the surface of the ring 15 rigid with the bearing 2 is the same as the distance between the scanning head 4 of the correcting member 5 and the shaft 1. The parts 14 and 15 constitute a second passage of variable cross-section. The feed pressure which is exerted on the opposite surfaces of the groove 17 formed in the scanning head between the parts 4 and 14 has no action on the operation. Obviously, for sake of convenience in execution, the correcting member may be constituted by the assembly of a plurality of parts.

It will now be seen that the bearing 2 is provided with a fluid pressure circuit including the inlet channel 24, edge portions 6 of the valve 5, chamber 13 which is controlled by surfaces 25 and 26, the said chamber 13 communicating with inner port 16 which in turn establishes communication with the outlet channel 10. Also, the fluid pressure circuit includes the bore 8 of the valve 5, the first leg 11 and the second leg 11a of an arcuate channel, the latter communicating directly with the chamber 3. Thus, when the shaft 1 is displaced from its normal position in the bearing 2, such displacement generates variable fluid pressure which results in counteracting the extraneous forces tending to disturb the equilibrium of the shaft in the body.

Furthermore the speed of response of the correcting member 5 subjected to the action of the difference in pressure to which it may be subjected should be such as will remain under all circumstances lower than that of the shaft 1 under the action of the modificatons in the stresses exerted on it.

Lastly, the arrangement is designed in a manner such that the distance between the surface 27 of the flange 14 of the correcting member facing the ring 15 and the edge of the scanning head 4 is equal to the distance between the surface 28 of the ring 15 and the outer surface of the shaft 1 when the latter is coaxial with the bearing 2 and the clearance between the two parts is uniformly distributed throughout their peripheries.

It is an easy matter to understand that under such conditions it is necessary for the correcting member 5 to find its position of equilibrium by making the forces exerted on it in opposite directions equal; for this reason and since said forces are exerted on surfaces of equal areas, the pressure of the fluid should be the same in the chambers 8 and 13. Now, in these two circuits provided for the flow of fluid, the pressures at the input and the cross-sections of the output ports are the same. Equality between the pressures is therefore obtained when the input ports have equal areas, i.e. when the distance between the flange 14 and the ring 15 which is the distance separating the adjusting ridges 25 and 26 is equal to the spacing between the scanning head 4 and the shaft 1.

A key 18 prevents the correcting member 5 from rotating round its axis, which would lead to a possible disturbance in the accuracy of the indications provided by the scanning head 4.

Lastly, the guiding of the correcting member 5 is ensured by a bearing 19 which may be lubricated if desired. The fluid under pressure flowing out of the chambers 8 and 13 which may leak through the extremely reduced clearance between the correcting member 5 and the rings 20 and 21 surrounding it is exhausted through the chambers 22 and 23 which latter communicate with the outside of the main bearing 2 through the channel 10.

The operation of the arrangement is as follows:

Assuming for instance that, the shaft 1 being in its initial position of equilibrium coaxial with the bearing 2, the component of the outer stresses applied perpendicularly to the chamber 3 subjected to pressure, which stresses urge the shaft 1 against the latter, increases in value. In the first place, before the correcting member 5 has fulfilled its operation by reason of the comparatively slow response given by it, the shaft 1 moves towards the wall of the bearing 2 on the side facing the chamber 3. Its distance with reference to the scanning head 4 increases together with the pressure of the fluid in the radial chamber 8 and consequently in the chamber 3, which pressure depends directly on said distance. When the antagonistic force produced by the pressure exerted by the fluid balances the component of the outer stress, the shaft 1 ceases moving in the direction considered.

The correcting member 5 which is subjected by the fluid contained inside the intermediate radial chamber 8 to a force which is higher than that exerted by the fluid inside the auxiliary chamber 13 will then, with a certain delay, move away from the shaft 1, the ridges 25 and 26 are spaced correspondingly and the pressure inside the chamber 13 increases. The movement of the correcting member 5 stops when the pressure is the same in the two chambers 8 and 13, that is when the distance between the ridge 25 on the flange 14 and the ridge 26 on the ring 15 is equal to the distance between the scanning head 4 and the outer surface of the shaft 1.

But any movement of the correcting member 5 towards its position of equilibrium will have a tendency, if the shaft 1 does not follow last-mentioned movement, to increase the distance between the scanning head 4 and the shaft 1 and consequently the pressure inside the chamber 3. The increase in the antagonistic force arising therethrough constrains thus the shaft 1 to accompany the correcting member 5 in its movements.

Thus, finally, the compensating movement of the correcting member 5 is accompanied by an equivalent movement in the same direction of the shaft 1 and equilibrium is obtained when the shaft 1 has returned into its starting position coaxially with the bearing 2.

The preceding disclosure has been given for the case where the fluid used for controlling the position of the shaft 1 is the same as that which feeds the chamber 3 subjected to pressure. Now, in certain cases, it is necessary to resort to different fluids.

Figure 3:
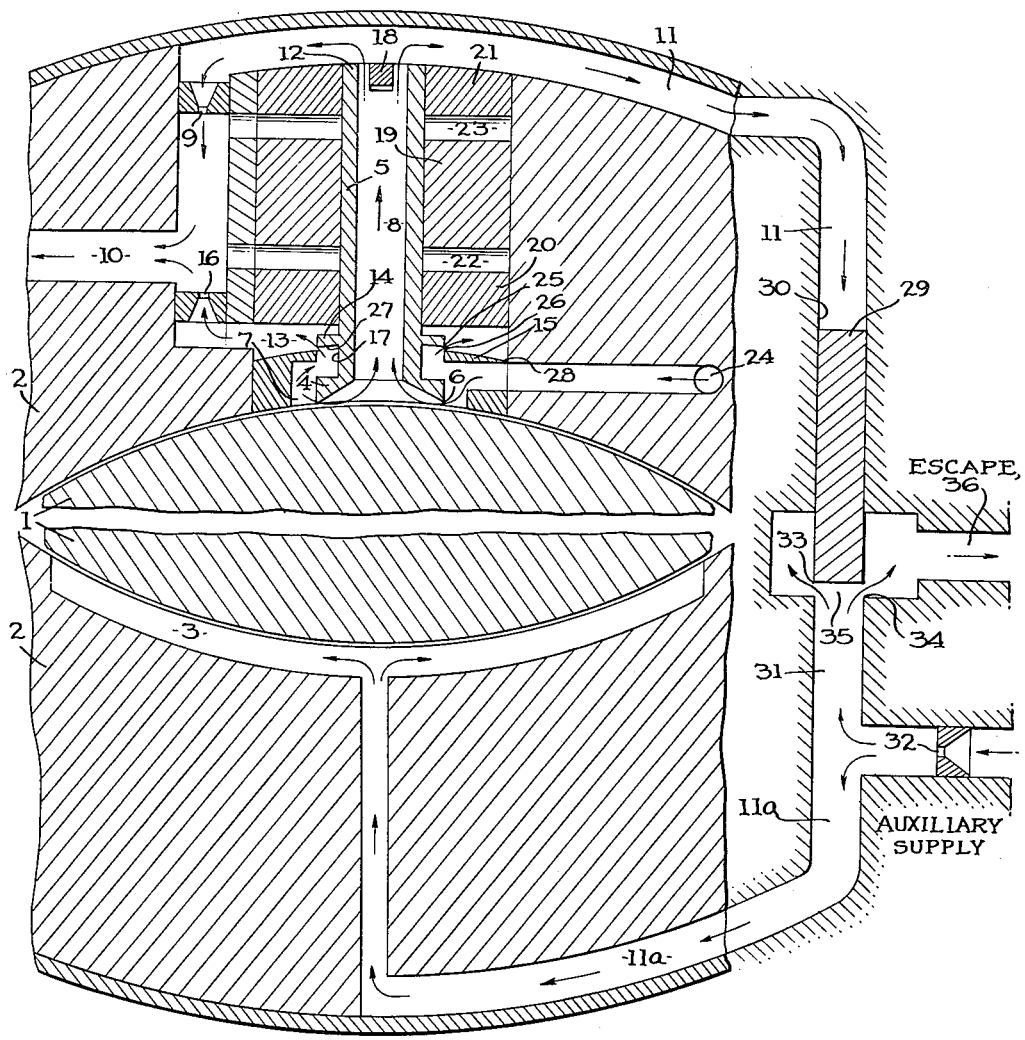
FIGURE 3 is a fragmentary cross section through a bearing, as shown in FIGURE 2, but includes an auxiliary fluid control arrangement.

FIG. 3 shows by way of example the principle of an arrangement adapted to serve for such a possible modification. The controlling fluid fed by the channel 11 out of the intermediate radial chamber 8 no longer feeds the chamber 3 subjected to pressure, but exerts a pressure on a movable wall separating the two fluids, which wall is formed in the example illustrated by one of the terminal surfaces of a slide valve 29 adapted to slide in a bore 30. The other terminal surface of the slide valve 29 is subjected to the pressure of the fluid feeding the chamber 3 and passing through the channel 11a into the chamber 31, the slide valve being thus slidingly fitted between the chambers 30 and 31.

The pressure of last-mentioned fluid is produced by the flow thereof between two ports of which the first is constituted by a port 32 of an unvarying size which connects the chamber 31 with the supply of fluid under pressure while the second port of an adjustable size is constituted by an annular passage formed by the clearance appearing between two ridges of which one is constituted by the edge 33 of the corresponding end of the slide valve 29 and the other by the edge 34 of a bore 35 the cross-section of which matches that of the slide valve and which forms part of the chamber 31, said bore 35 being connected with the outside of the bearing 2 through the channel 36.

The operation of this arrangement is extremely simple: The slide valve 29 the location of which adjusts the area of the output opening of the fluid circuit feeding the chamber 3 and consequently the pressure of the fluid in said circuit is always held in equilibrium under the action of the pressure exerted on both surfaces of said slide valve. The condition of equilibrium is therefore reached when the pressure of the fluid inside the chamber 3 and inside the channel 11a is equal to that of the controlling fluid inside the channel 11.

Obviously, as disclosed hereinabove, the general principles overlying the method described may be resorted to for the most various applications and they may lead to embodiments which are very different from that which has just been described in detail and which should be considered only as a mere example.

According to a modification and in order to provide between the ridges 25 and 26 exactly the same conditions of flow for the fluid as those obtained when it passes between the edge 6 of the scanning head 4 and the surface of the movable body 1, the opening of the ring 15 may have a diameter smaller than the outer diameter of the flange 14 so that the passage of a variable cross-section at the input in the auxiliary chamber 13 may be provided between the ridge 25 of the shoulder 14 and the outer surface 28 on the ring 15 facing said ridge.

Any modification in the structural data disclosed hereinabove would have for its consequence a slight shifting of the position of equilibrium and such a shifting may also arise as a consequence of the machining limits. It is possible, for instance, to simplify the structure described by substituting flat surfaces for the part cylindrical surfaces 27 and 28. The error arising therethrough for the position of equilibrium of the shaft may be perfectly allowable for certain practical applications.

I claim:
1. In an automatically self-adjusting fluid bearing, the combination, comprising,
a shaft,
a stationary bearing rotatably supporting said shaft with operating clearance and having a fluid pressure chamber in communication with said clearance by the first leg and the second leg of an arcuate channel,
said bearing further having a fluid inlet passage and a fluid outlet channel in communication with an outer port and an inner port,
rings in said bearing,
a tubular correcting member disposed in said rings to slide radial to the axis of the shaft and located opposite said fluid pressure chamber,
said member having its outer end communicating with the said first leg of the arcuate channel,
a scanning head at the inner end of said member and in communication with said clearance opposite said chamber to regulate variable fluid pressures resulting from displacement of the shaft from its normal position,
an external flange on the correcting member and spaced from said scanning head,
and means forming an annular compartment communicating with said fluid inlet and surrounding said scanning head,
said flange cooperating with said means to serve as a valve establishing communication with a connecting chamber leading to said inner port and fluid inlet while maintaining said member in communication with the first leg of said arcuate channel.

2. In an automatically self-adjusting fluid bearing, the combination, comprising,
a shaft,
a stationary bearing rotatably supporting said shaft with operating clearance and having a fluid pressure chamber in communication with said clearance by means in said bearing forming a fluid pressure circuit including a fluid inlet passage and a fluid outlet channel in communication with an outer port and an inner port,
a tubular shaft correcting member included in said fluid pressure circuit and disposed in said bearing radial to the axis of the shaft opposite said fluid pressure chamber, said member having its outer end communicating with said fluid pressure circuit,
a scanning head at the inner end of said member and responsive to fluid pressure in said clearance opposite said chamber to regulate variable fluid pressures resulting from displacement of the shaft from its normal position,
an external flange on the correcting member and spaced from said scanning head,
and means forming an annular compartment communicating with said fluid inlet and surrounding said scanning head,
said flange cooperating with said means to serve as a valve establishing communication with a connecting chamber leading to said inner port and fluid inlet while maintaining the outer end of said member in communication with said fluid circuit.

3. In an automatically self-adjusting fluid bearing, the combination, comprising,
a shaft,
a stationary bearing rotatably supporting said shaft with operating clearance and having a fluid pressure chamber in communication with said clearance,
means in said bearing providing a fluid pressure circuit communicating with said clearance and chamber and also with a fluid inlet and a fluid outlet,
a tubular valve having a bore in said fluid pressure circuit and slidable in said bearing radial to the axis of the shaft opposite said fluid pressure chamber,
a scanning head at the inner end of the bore of said valve and in communication at one end with said clearance opposite said chamber and having its other end in communication with said fluid circuit,
and means responsive to change of position of said shaft relative to the bearing to cause said scanning head to control the pressure in said chamber to maintain the shaft in proper relation to the bearing.

4. An apparatus for assuring the alignment of a shaft with respect to a fixed bearing comprising,
at least one chamber disposed between the adjacent walls of the shaft and bearing,
means for supplying fluid under pressure to said chamber,
means responsive to relative change in position of the movable body and the fixed body to regulate the intensity of the variable force exerted by the fluid under pressure within said chamber as a function of the component of the exterior stress exerted upon the shaft,
said responsive means comprising a tubular valve constituting a correcting member having a bore and capable of sliding within the bearing and whose position with respect to the shaft regulates the intensity of said variable force,
said valve having a tubular scanning head provided with an edge conforming to the contour of the shaft and whose distance relative to movable body is controlled by the fluid pressure in the bore of the valve through which the fluid passes to an input orifice and an output orifice, whereby,
the said valve undergoes a compensatory displacement and in consequence moves from or toward the shaft which assures its positioning by an amount equal to the distance by which the movable body nears or draws away from said valve in order to bring back said shaft to its initial position of equilibrium with respect to the bearing.

5. In an automatically self-adjusting fluid bearing, the combination comprising,
a shaft,
a stationary bearing body rotatably supporting said shaft with operating clearance and having a fluid pressure chamber in communication with said clearance,
means in said bearing providing a fluid pressure circuit communicating with said clearance and chamber and also including a fluid inlet and a fluid outlet,
a valve in the body disposed radially to the shaft and having a bore in communication with said fluid pressure circuit and slidable relative to said bearing body opposite said fluid pressure chamber,
a scanning head at the inner end of the bore of said valve cooperating with the profile of said shaft to provide a first passage of variable crosssection therewith and communicating with said clearance, the outer end of said bore communicating with said fluid pressure circuit,
means responsive to change the position of said shaft relative to the bearing to cause said scanning head to control pressure in said chamber to maintain the shaft in proper relation to the bearing body,
said means including a second passage of variable cross-section in said fluid pressure circuit, said second passage being limited between a part secured to the bearing body and a part secured to said valve,
an auxiliary chamber on the outside of said valve, fed by the supply of fluid pressure through said second passage of variable cross section, the shifting of the valve member providing variation of the cross section of said second passage whereby equilibrium of the valve member with reference to the shaft is reached when the cross sectional area of said second passage is equal to that of the first variable cross sectional area between the scanning head and the shaft,
an auxiliary fluid supply passage communicating with said fluid chamber through said fluid inlet,
and means slidable in said fluid circuit and responsive on one hand to fluid pressure in the bore through said fluid outlet and responsive on the other hand to pressure in said chamber through said fluid inlet to adjust the fluid pressure opposing extraneous forces in said chamber.

6. In an automatically self-adjusting fluid bearing according to claim 5, wherein,
said means is slidable in an auxiliary inlet chamber and an auxiliary outlet chamber respectively communicating with the said fluid inlet and the fluid outlet and operates in conjunction with the auxiliary fluid supply passage,
an escape passage of variable cross section for said auxiliary fluid supply passage,
said escape passage being limited by edge secured to said bearing body and by edge secured to said slidable means.

References Cited in the file of this patent
UNITED STATES PATENTS

| | | |
|---|---|---|
| 2,578,713 | Martellotti | Dec. 18, 1951 |
| 2,692,803 | Gerard | Oct. 26, 1954 |
| 2,788,862 | Langer | Apr. 16, 1957 |
| 2,976,087 | Cherubim | Mar. 21, 1961 |

FOREIGN PATENTS

| | | |
|---|---|---|
| 899,172 | Germany | Dec. 10, 1953 |

OTHER REFERENCES
Product Engineering, 1953 Annual Handbook, pages J2 thru J5 relied upon.